United States Patent
Khare et al.

(10) Patent No.: US 12,367,859 B2
(45) Date of Patent: Jul. 22, 2025

(54) ARTIFICIAL INTELLIGENCE FACTSHEET GENERATION FOR SPEECH RECOGNITION

(71) Applicant: INTERNATIONAL BUSINESS MACHINES CORPORATION, Armonk, NY (US)

(72) Inventors: Shreya Khare, Bangalore (IN); Ashish R. Mittal, Bengaluru (IN); Saneem Ahmed Chemmengath, Bangalore (IN); Samarth Bharadwaj, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 17/809,202

(22) Filed: Jun. 27, 2022

(65) Prior Publication Data
US 2023/0419950 A1    Dec. 28, 2023

(51) Int. Cl.
G10L 15/01    (2013.01)
G10L 15/16    (2006.01)
G10L 15/30    (2013.01)

(52) U.S. Cl.
CPC ............. *G10L 15/01* (2013.01); *G10L 15/16* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 6,622,121 B1 | 9/2003 | Crepy | |
| 7,684,988 B2 | 3/2010 | Barquilla | |
| 10,276,163 B1 | 4/2019 | Lei | |
| 11,315,570 B2 * | 4/2022 | Allibhai | G10L 21/028 |
| 2005/0049868 A1 | 3/2005 | Busayapongchai | |
| 2006/0235687 A1 * | 10/2006 | Carus | G10L 15/197 704/E15.002 |
| 2017/0329466 A1 | 11/2017 | Krenkler | |
| 2019/0013038 A1 * | 1/2019 | Thomson | G06F 40/20 |

(Continued)

FOREIGN PATENT DOCUMENTS

CN      102723080 B      6/2014

OTHER PUBLICATIONS

Bharadhwaj, Homanga, "Layer-wise relevance propagation for explainable deep learning based speech recognition," 2018, 6 pages.

(Continued)

*Primary Examiner* — Nicole A K Schmieder
(74) *Attorney, Agent, or Firm* — Kimberly Zillig (57) ABSTRACT

A method, system, and computer program product for automated artificial intelligence (AI) factsheet generation for modeling and model customization in speech to text (STT) services. The method receives audio data for a user. The audio data contains human speech. Text data is generated, using a first speech to text model, to represent the human speech of the audio data. A set of transcription errors of the first speech to text model are identified. A set of AI factsheets are generated to describe model metadata for the first speech to text model. Based on the set of transcription errors and the set of AI factsheets, the method generates a second speech to text model customized to the user.

12 Claims, 6 Drawing Sheets

(56) References Cited

U.S. PATENT DOCUMENTS

| | | | |
|---|---|---|---|
| 2019/0206389 A1* | 7/2019 | Kwon | G10L 15/07 |
| 2019/0287519 A1* | 9/2019 | Ediz | G06F 40/30 |
| 2021/0133162 A1 | 5/2021 | Arnold | |
| 2021/0217403 A1 | 7/2021 | Chae | |

OTHER PUBLICATIONS

Calore, Michael "Watch People with Accents Confuse the Hell Out of AI Assistants," https://www.wired.com/2017/05/ai-assistants-accented-english/, downloaded from the internet Jun. 24, 2022, 1 page.

Danilevsky et al., "A Survey of the State of Explainable AI for Natural Language Processing," arXiv:2010.0071v1 [cs.CL], Oct. 1, 2020, 13 pages.

Errattahi, et al., "Automatic Speech Recognition Error Detection Using Supervised Learning Techniques," 13th International Conference of Computer Systems and Applications, Nov. 29, 2016, 7 pages.

Errattahi, et al., "Automatic Speech Recognition Errors Detection and Correction: A Review," ScienceDirect Procedia Computer Science, 2018, pp. 32-37, vol. 128.

Lin, Zhong Qiu, "Quantifying the Performance of Explainability Algorithms," 2020, 72 pages.

Mell et al., "The NIST Definition of Cloud Computing," Recommendations of the National Institute of Standards and Technology, U.S. Department of Commerce, Special Publication 800-145, Sep. 2011, 7 pgs.

Mirzaei, et al., "Errors in automatic speech recognition versus difficulties in second language listening," Critical CALL—Proceedings of the 2015 EUROCALL Conference, 2015, pp. 410-415, Research-publishing. net, Dublin Ireland.

Mirzaei, et al., "Exploiting Automatic Speech Recognition to Enhance Partial and Synchronized Caption for Facilitating second language Listening," Computer Speech and Language, May 2018, 21 pgs.

"Human and Humanizing Speech Technology", Interspeech, retrieved from web https://www.interspeech2022.org, Sep. 18-22, 2022, 75 pages.

* cited by examiner

ARTIFICIAL INTELLIGENCE FACTSHEET GENERATION FOR SPEECH RECOGNITION

BACKGROUND

Speech to text (STT) services generate text from human speech or audio segments. Current STT services are automated, often using machine learning or artificial intelligence (AI) modeling to identify human speech within an audio segment and reduce that human speech to a text representation. Current STT services may operate in real-time or near real-time, support multiple languages, and operate on various audio formats.

SUMMARY

According to an embodiment described herein, a computer-implemented method for AI factsheet generation in modeling and model customization in STT services is provided. The method receives audio data for a user. The audio data contains human speech. Text data is generated, using a first speech to text model, to represent the human speech of the audio data. A set of transcription errors of the first speech to text model are identified. A set of AI factsheets are generated to describe model metadata for the first speech to text model. Based on the set of transcription errors and the set of AI factsheets, the method generates a second speech to text model customized to the user.

According to an embodiment described herein, a system for AI factsheet generation in modeling and model customization in STT services is provided. The system includes one or more processors and a computer-readable storage medium, coupled to the one or more processors, storing program instructions that, when executed by the one or more processors, cause the one or more processors to perform operations. The operations receive audio data for a user. The audio data contains human speech. Text data is generated, using a first speech to text model, to represent the human speech of the audio data. A set of transcription errors of the first speech to text model are identified. A set of AI factsheets are generated to describe model metadata for the first speech to text model. Based on the set of transcription errors and the set of AI factsheets, the operations generate a second speech to text model customized to the user.

According to an embodiment described herein, a computer program product for augmented reality-based vehicle diagnostics is provided. The computer program product includes a computer-readable storage medium having program instructions embodied therewith, the program instructions being executable by one or more processors to cause the one or more processors to receive audio data for a user. The audio data contains human speech. Text data is generated, using a first speech to text model, to represent the human speech of the audio data. A set of transcription errors of the first speech to text model are identified. A set of AI factsheets are generated to describe model metadata for the first speech to text model. Based on the set of transcription errors and the set of AI factsheets, the computer program product generates a second speech to text model customized to the user.

DETAILED DESCRIPTION

The present disclosure relates generally to methods for STT services. More particularly, but not exclusively, embodiments of the present disclosure relate to a computer-implemented method for automated AI factsheet generation for modeling and model customization in STT services. The present disclosure relates further to a related system for STT services, and a computer program product for operating such a system.

STT services generate text from human speech. Current STT services may be automated to provide real-time speech recognition, support for multiple languages, support for varying audio formats and audio quality, secured encryption, streaming speech recognition, and vocabulary filtering. Current STT services lack assurance mechanisms, confidence values, transparency in modeling, and explanation of results.

Embodiments of the present disclosure generate, modify, and customize STT service models to provide transparent speech to text modeling and explanation of results. The present disclosure enables confidence generation and data quality assurance for STT services. Embodiments of the present disclosure enable variable, stepwise, and user specified customization of STT models based on user preferences and provided audio segments as input data. Embodiments of the present disclosure provide assurance mechanisms, confidence values, modeling transparency, and result explanation by automated generation and incorporation of AI factsheets. Some embodiments of the present disclosure generate model performance AI factsheets for global model explanation and evaluation. Some embodiments of the present disclosure generate AI factsheets for local explanations for transcribed text. The present disclosure provides generation and incorporation of AI factsheets as confidence sheets and data quality metric evaluation for constrained customization.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
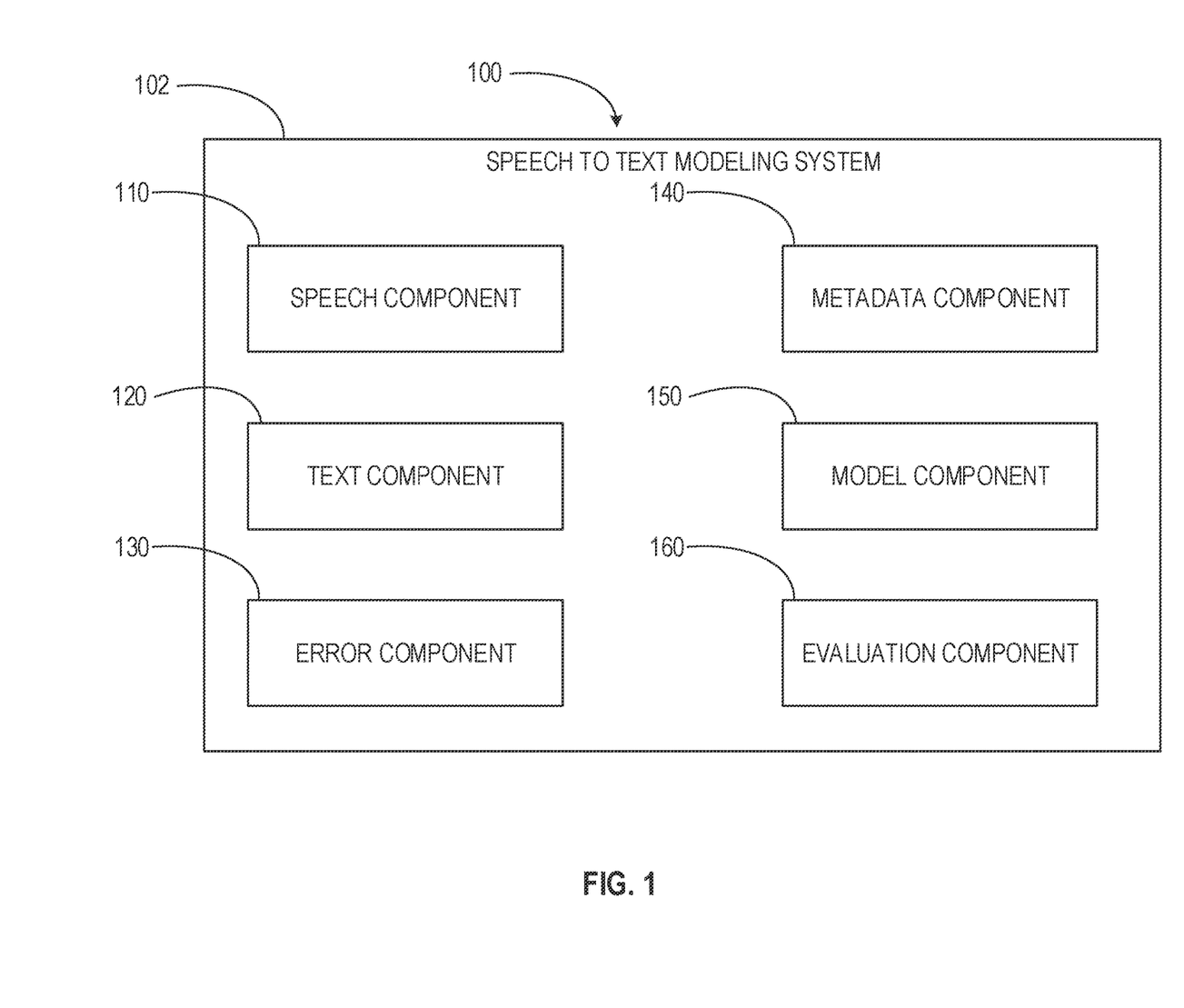
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an STT modeling system 102. The STT modeling system 102 may comprise a speech component 110, a text component 120, an error component 130, a metadata component 140, a model component 150, and an evaluation component 160. The speech component 110 receives audio data including human speech segments. The text component 120 generates text data representations of audio data using speech to text models. The error component 130 identifies transcription errors of the speech to text models in text representations of audio data. The metadata component 140 generates AI factsheets describing model metadata of aspects or portions of speech to text models. The model component 150 generates new speech to text models based on specified customization attributes, AI factsheets, and transcription errors. The evaluation component 160 evaluates speech to text models and transcription errors based on generated AI factsheets. Although described with distinct components, it should be understood that, in at least some embodiments, components may be combined or divided, and/or additional components may be added without departing from the scope of the present disclosure.

Figure 2:
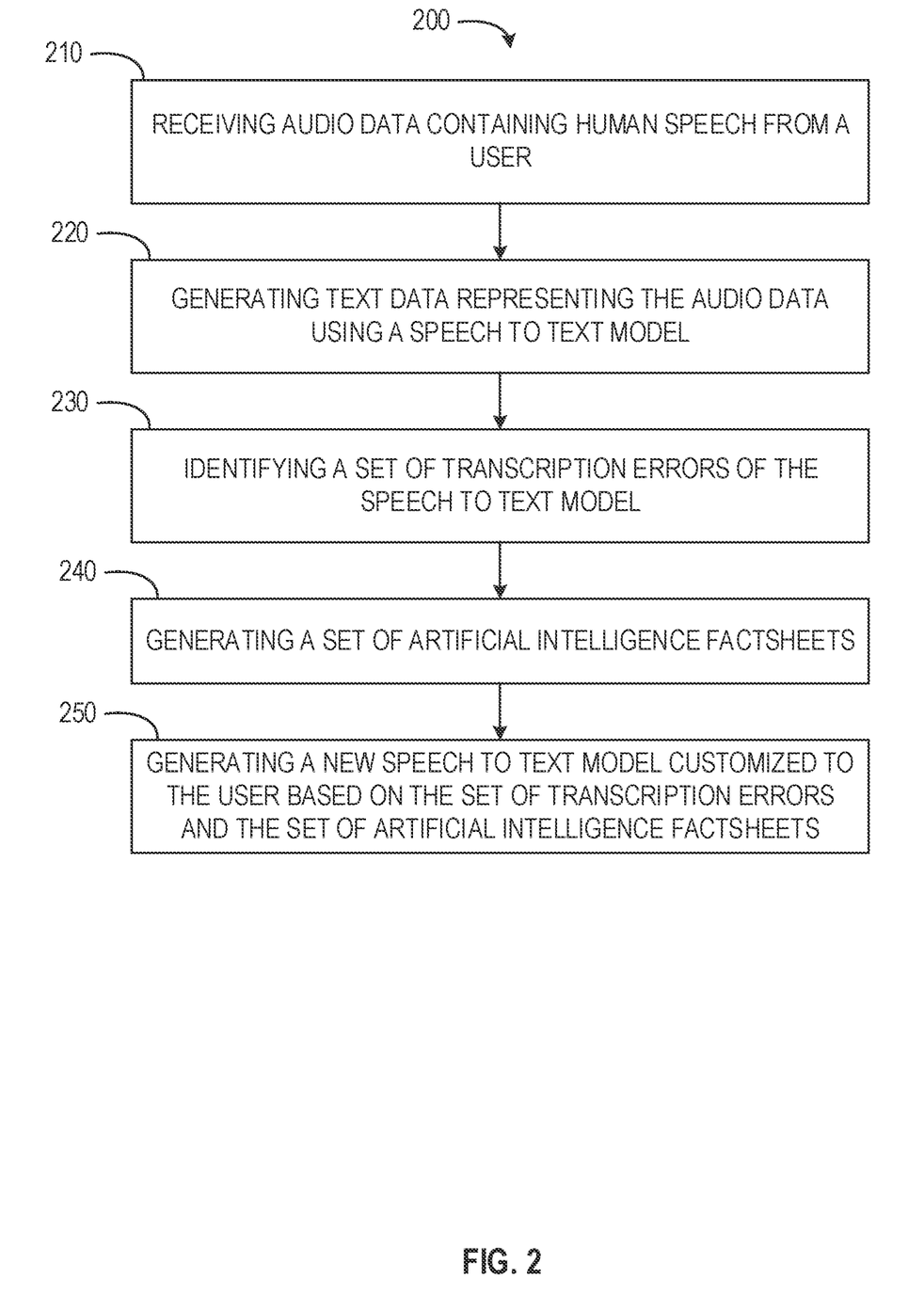
FIG. 2 depicts a flow diagram of a computer-implemented method for automated AI factsheet generation and use in STT services, according to at least one embodiment.

Referring now to FIG. 2, a flow diagram of a computer-implemented method 200 is shown. The computer-implemented method 200 is a method for automated AI factsheet generation for modeling and model customization in STT services. In some embodiments, the computer-implemented method 200 may be performed by one or more components of the computing environment 100, as described in more detail below.

At operation 210, the speech component 110 receives audio data. The audio data may be associated with or received from a specified user. In some embodiments, the audio data contains human speech. The user may sign up for or sign into a STT modeling service associated with the STT modeling system 102. Once signed into the STT modeling service, the user may transmit or provide access to the audio data. The audio data may contain a segment or set of segments of human speech. In some embodiments, the audio data contains a training set of segments of human speech. The training set of segments may be used for STT model customization for the specified user.

At operation 220, the text component 120 generates text data representing the audio data. The text data may represent human speech within the audio data. In some embodiments, the text component 120 generates the text data using a speech to text model. The speech to text model may be a first or initial speech to text model to which the audio data is input. The text component 120 may generate the text data by passing at least a portion of the audio data to the initial speech to text model. The initial speech to text model may then output the text data.

The STT model may generate the text data recognizing speech and text metrics. In some embodiments, the STT model generates the text data using speech variation metrics including speaker variabilities, noise adherence, language identification, language switch point identification, emotion coverage, age, and other suitable and detectable speech metrics. In some instances, speaker variabilities include accent or dialect variability, accent or dialect error rates, gender coverage, speaking style, and other suitable or detectable lingual variability.

In some embodiments, the text metrics include unseen words, language switch point identification, homophones, negatives, breached boundaries, verb inflection, noun inflection, determiners or stop lists, interjection/disfluencies, derivational suffixes, minimal pair errors, and other suitable text metrics.

At operation 230, the error component 130 identifies a set of transcription errors of the speech to text model. In some instances, the error component 130 identifies the set of transcription errors generated by the first speech to text model in generating the text data. In some embodiments, the set of transcription errors are or include automatic speech recognition (ASR) errors.

The ASR errors may include character errors, word errors, and sentence errors. Character errors may include insertion errors, deletion errors, and substitution errors. Character errors may occur where individual characters within the text data are incorrectly transcribed from the audio data. Word errors may include unidentified/out-of-vocabulary (OOV)/missed errors, intelligible errors, incorrect language/script identification errors, misspellings, homophone errors, minimal pairs errors, negatives, or any other word level error. Word errors may occur where words within the text data are omitted, substituted, or otherwise incorrectly transcribed from the audio data. Sentence errors may include missing context, incorrect language/script identified, incorrect semantics, or any other suitable sentence level errors. Sentence errors may occur where sentences, or portions thereof, within the text data are incorrectly transcribed or generated from the audio data.

Where the set of transcription errors include ASR errors, the error component 130 may determine a set of characteristics for the set of ASR errors. The error component 130 may the attribute the set of ASR errors to a set of speech features of the audio data. Speech features may include lingual features, speech rate, prosodic features, word choice, and other suitable speech features. Lingual features may include disfluency (e.g., incorrect word selection or translation), pronunciation, or other relevant and detectable audible elements of human speech. Speech rate may include pitch, intensity, words per minute, and other relevant and detectable aspects of the speed of human speech. Prosodic features may include phone duration (e.g., duration of specified sounds within speech), fundamental frequency, phone energy, and any other relevant and detectable aspect of rhythm and intonation of human speech. Word choice may include word length, number of pronunciations, number of homophones, and other relevant and detectable aspects of word selection within the human speech. The ASR errors may be attributed to the speech features based on the set of characteristics. In some embodiments, each ASR error may be attributed to one or more characteristic of the set of characteristics or one or more speech feature of the set of speech features.

In some embodiments, the error component 130 clusters ASR errors of the set of ASR errors to generate ASR error clusters. Each ASR error cluster may be associated with at least one speech feature of the audio data. The error component 130 may cluster the ASR errors with speech features using perturbation-based learning to identify speech features affecting specified ASR error clusters. The error component 130 may associate ASR error clusters with speech features based on nearest neighbor instance search. In such embodiments, the error component 130 using classifiers to search for similar ASR errors or ASR error clusters using a nearest neighbor search. In such instances, the error component 130 may train a clustering model to generate a prosody classifier. The error component 130 may select similar utterances from a training data set. Those utterances may then be used to test the prosody classifier. The prosody classifier may then be used in combination with the text component 120 and the error component 130 to classify errors as being associated with specified speech features while unlabeled data (e.g., human speech in audio data) is transcribed.

At operation 240, the metadata component 140 generates a set of AI factsheets. The AI factsheets describe model metadata for the speech to text model. In some instances, the set of AI factsheets describe model metadata for the first speech to text model. The set of AI factsheets may provide model metadata relating to model performance, confidence values for transcribed text, data quality metrics for constrained customization (e.g., budget constrained customization), combinations thereof, or any other suitable metadata. In some instances, the set of AI factsheets enable standardized comparison across different candidate models, such as the initial speech to text model and one or more subsequent or customized speech to text models.

In some embodiments, the metadata component 140 generates confidence sheet as part of the set of AI factsheets. The confidence sheet may be generated as an AI factsheet for the transcribed text data generated in operation 220. The confidence sheet may represent a local explanation of the initial speech to text model. The local explanation may be an explanation of the confidence of one or more aspects of the transcribed text in the text data. The confidence sheet may provide local explanation by providing values or representations of audio quality, transcript quality, stylization, and data redaction metrics. Audio quality metrics may include speech rate, clarity of speech, noise ratio, presence of prosody, word duration, style, language switching, number of speakers, and other relevant and detectable metrics. Transcript quality metrics may include misspelling errors, unknown words errors, missing context errors, entity presence, and other suitable and identifiable errors. In some instances, the metadata component 140 generates a customization factsheet. In some embodiments, the local explanation of the confidence sheet may provide word level explanations. The metadata component 140 may use a forced aligner to obtain soft boundaries for word level operations of the initial speech to text model. The metadata component 140 may focus on segmental features to provide word level explanations where text errors are high. The metadata component 140 may also provide word level explanations using keyword spotting for OOVs. The keyword spotting may be term frequency-inverse document frequency (TF-IDF) based.

The customization factsheet may represent a local explanation of data quality metrics of the initial speech to text model for customization of the model or generation of a subsequent speech to text model. In some embodiments, the customization factsheet provides data quality metrics or explanations on constrained customization. For example, given a budget, computing cycle, resource, or any other suitable customization constraint, the metadata component 140 may provide data metrics based on the customization factsheet and model performance. The metadata component 140 may use a minimal customization API cost, along with the customization factsheet, to indicate a minimal number of instances for efficient customization of the speech to text model. In some embodiments, the customization factsheet provides local explanation of data quality metrics by providing values or representations of speaker customization using speech variation metrics and text metrics. The speech variation metrics may represent speaker customization of models based on explanations of drifts in speaker distribution models. The text metrics may represent vocabulary changes or increases between models, distributional drift language models, and handling of particular types of errors.

The confidence sheet and the customization factsheet may be considered instance factsheets and may provide instance explanations for the text data transcribed from the human speech of the audio data. The instance factsheets may provide local utterance explanations and indicate customization history of a model. Instance factsheets may be used as input to a summarization module. The instance level factsheets may be used to summarize results for a model AI factsheet for a particular data set. The instance level factsheets may explain to a user what changed between training and testing of a model. For example, the instance level factsheets may indicate a change of accent or code, mixed utterances causing text transcription failures detected within the set of transcript errors. The instance level factsheets may also increase confidence in model errors, explain why identified errors occurred, and provide information or suggestions on potential corrective actions. The instance level factsheets may also provide user feedback. For example, the instance level factsheets may provide user persona feedback suggesting accent modification to improve articulation of speech and text transcription with fewer errors within the set of transcription errors. The user feedback may also provide re-record prompts indicating certain aspects of the human speech to re-record to improve model performance.

In some embodiments, the metadata component 140 generates a model AI factsheet. The model AI factsheet may represent a global explanation for the initial speech to text model. The model AI factsheet may provide global explanation for model performance of the initial speech to text model. The model AI factsheet may provide the global explanation of the initial speech to text model by providing representations of speech variation and text metrics. The model AI factsheet may also provide global explanation by providing representations of word error rate (WER), character error rate (CER), sentence error rate (SER), and real-time factor (RTF) metrics. In some embodiments, the model AI factsheet provides global level explanations and visualization for the set of ASR transcription errors within the text data. In some instances, the model AI factsheet provides data redaction metrics. The data redaction metrics may represent testing of whether a given speech to text model emits sensitive information.

At operation 250, the model component 150 generates a new speech to text model. In some embodiments, the new speech to text model is generated as a second speech to text mode. The new speech to text model may be generated as a speech to text model customized to the user. In some embodiments, the model component 150 generates the new speech to text model based on the set of transcription errors. The model component 150 may generate the new speech to text model based on the set of transcription errors and the set of AI factsheets.

In some embodiments, the model component 150 generates the new speech to text model by determining a customization level for the second speech to text model. The level of customization may be determined based on the set of AI factsheets.

Figure 3:
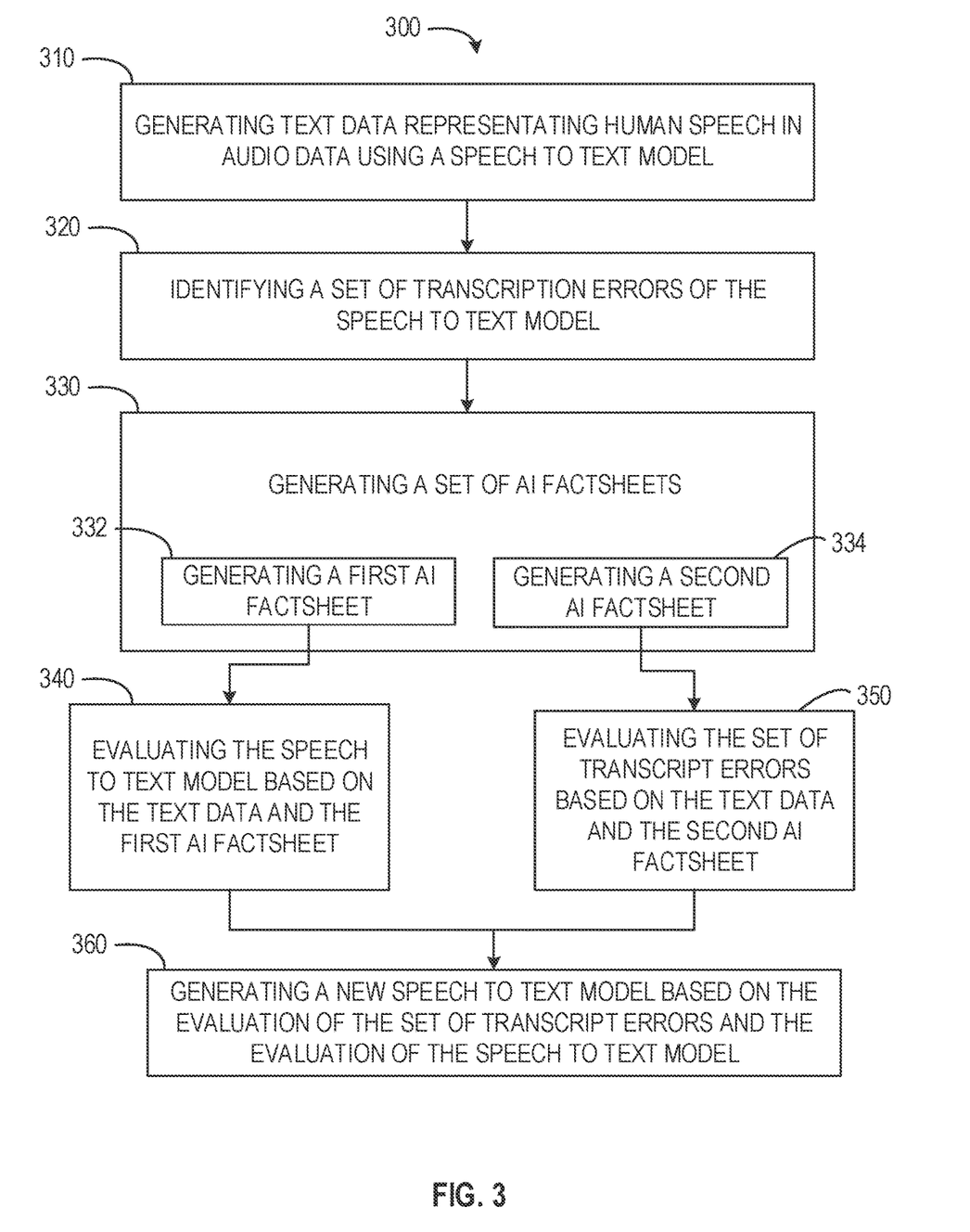
FIG. 3 depicts a flow diagram of a computer-implemented method for automated AI factsheet generation and use in STT services, according to at least one embodiment.

FIG. 3 shows a flow diagram of an embodiment of a computer-implemented method 300 for automated AI factsheet generation for modeling and model customization in STT services. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the text component 120 generates text data representing the audio data. The text data may be generated using a speech to text model. The speech to text model may be a first speech to text model. The first speech to text model may be used as an initial speech to text model for customization based on the audio data or the user associated with the audio data. In some embodiments, the text component 120 performs operation 310 in a manner similar to or the same as described above with respect to operation 220.

In operation 320, the error component 130 identifies a set of transcription errors of the speech to text model. In some embodiments, the error component 130 performs operation 320 in a manner similar to or the same as described above with respect to operation 230.

In some embodiments, the error component 130 generates an error visualization based on the set of transcription errors. In some instances, the error visualization includes visual representations of ASR errors. The error visualization may be a graphical representation of at least a portion of the set of transcription errors. In some embodiments, the graphical representation may be a combination of graphical interface elements or graphical user interfaces representing the set of transcription errors. In some instances, the error visualization produces an audio spectrogram of an input speech signal. The input speech signal may be the audio data or the human speech contained within the audio data. The error component 130 may generate a stylized output within the error visualization representing the set of transcription errors or portions thereof. For example, the error component 130 may highlight a visual anomaly of a speech signal corresponding to a speech profile. The visual anomaly may be highlighted using changes in color, pattern, point distribution, or any other suitable anomaly visualization. By way of further example, the error component 130 may generate a color distribution within a graph representing a speech profile within the audio data using a distribution-based classifier. Transcription errors may be represented as a change in color, pattern, hue, or other suitable visual representation, placing the one or more transcription errors outside of the color range, pattern, or other visual representation to enable human inspectors to identify the transcription error.

In operation 330, the metadata component 140 generates a set of AI factsheets. In some embodiments, the set of AI factsheets is a plurality of AI factsheets. The plurality of factsheets may be generated in a manner similar to or the same as described above with respect to operation 240.

The metadata component 140 may generate a first AI factsheet in operation 332. The first AI factsheet may be generated for a first speech to text model. In some embodiments, the first AI factsheet is a model factsheet. The first AI factsheet may describe global metadata for an STT model regardless of training data used to train the STT model. In some embodiments, the first AI factsheet is responsible for or used to test an STT model and STT model API using varied metrics.

The metadata component 140 may generate a second AI factsheet in operation 334. The second AI factsheet may be generated for the first speech to text mode. In some embodiments, the second AI factsheet is a transcript factsheet. The second AI factsheet may be an instance level AI factsheet. In some embodiments, the second AI factsheet may be a confidence sheet summarizing results for AI model factsheets for a particular dataset. The confidence sheet may explain changes between model iterations or customizations. The confidence sheet may also explain changes between training/testing of a given STT model. For example, the confidence sheet may explain model changes which address a change in accent or code-mixed utterances which previously caused failures or errors in transcriptions by the model.

In operation 340, the evaluation component 160 evaluates the first speech to text model based on the text data and the first AI factsheet. The first AI factsheet may be a model AI factsheet. The model AI factsheet may provide global explanations for the first speech to text model using metadata representations for the model. The first AI factsheet may be generated in a manner similar to or the same as described above with respect to operation 240. The evaluation component 160 may evaluate the first speech to text model by determining global or overall model performance of the first speech to text model based on metadata representations for the first speech to text model within the model AI factsheet.

In operation 350, the evaluation component 160 evaluates the set of transcription errors based on the text data and the second AI factsheet. The second AI factsheet may be a confidence sheet. The confidence sheet may provide local explanations for confidence levels of words, phrases, sentences, or other aspects of the text data. In some instances, the confidence sheet may provide local explanations indicating relative confidence scores or representations for aspects of the text data identified as transcription errors and aspects of the text data identified as correct transcriptions. The second AI factsheet may be generated in a manner similar to or the same as described above with respect to operation 240.

In operation 360, the model component 150 generates a new speech to text model based on the evaluation of the set of transcription errors and the evaluation of the first speech to text model. The model component 150 may generate the new speech to text model as a subsequent speech to text model based on the first speech to text model, the first AI factsheet, and the second AI factsheet. In some instances, the model component 150 identifies training data or subsets thereof for input to train the new speech to text model. The training data may be selected to train the new speech to text model to address deficiencies represented by the set of transcription errors identified from the first speech to text model.

In some embodiments, upon generating the new speech to text model, the metadata component 140 generates a customization factsheet. The customization factsheet may be generated in a manner similar to or the same as described above with respect to operation 240. In some embodiments, the customization factsheet represents local explanations of data quality metrics and metadata representations which occur based on changes between the first speech to text model and the new speech to text model.

Figure 4:
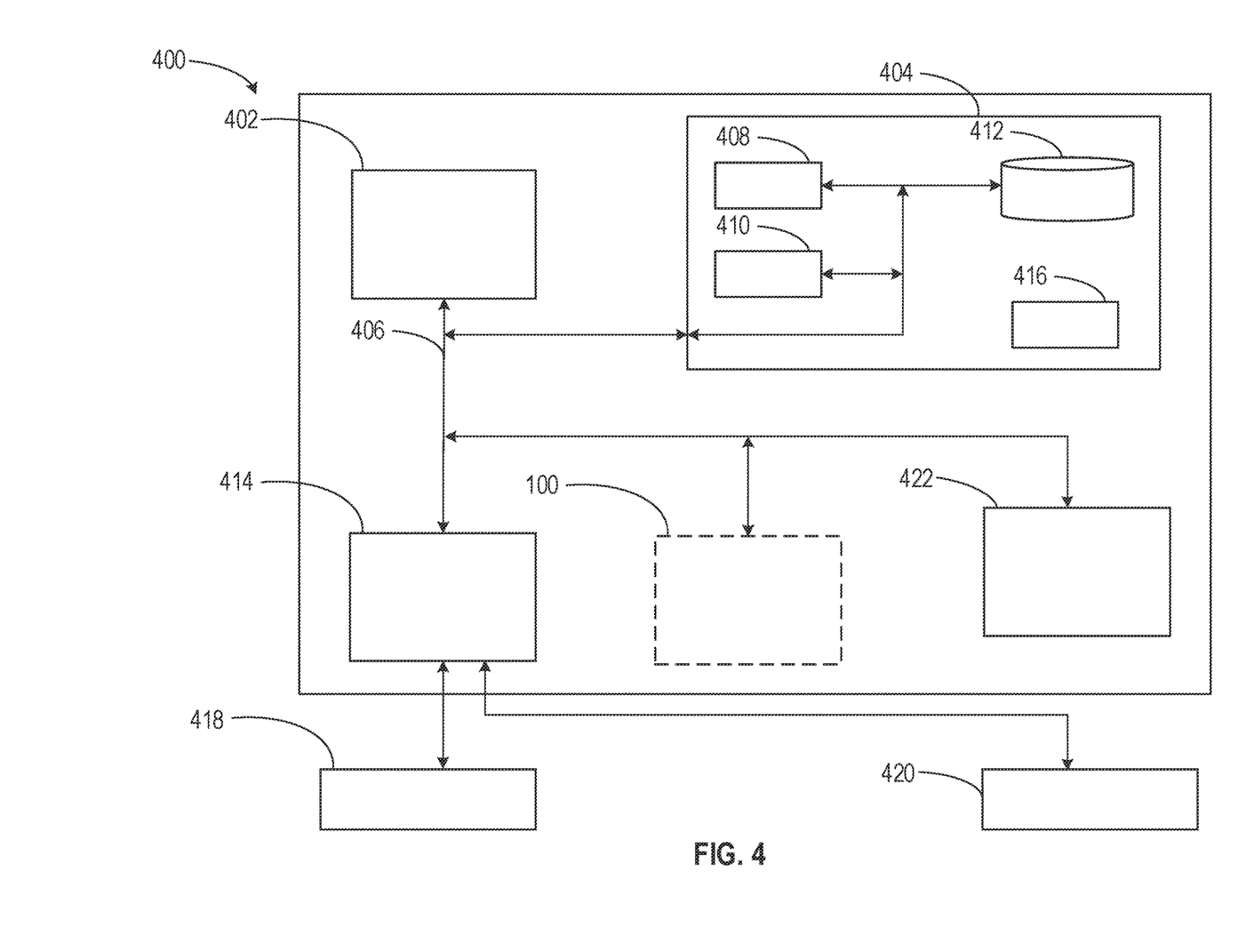
FIG. 4 depicts a block diagram of a computing system for automated AI factsheet generation and use in STT services, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for automated AI factsheet generation for modeling and model customization in STT services.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the speech component 110, the text component 120, the error component 130, the metadata component 140, the model component 150, and the evaluation component 160, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
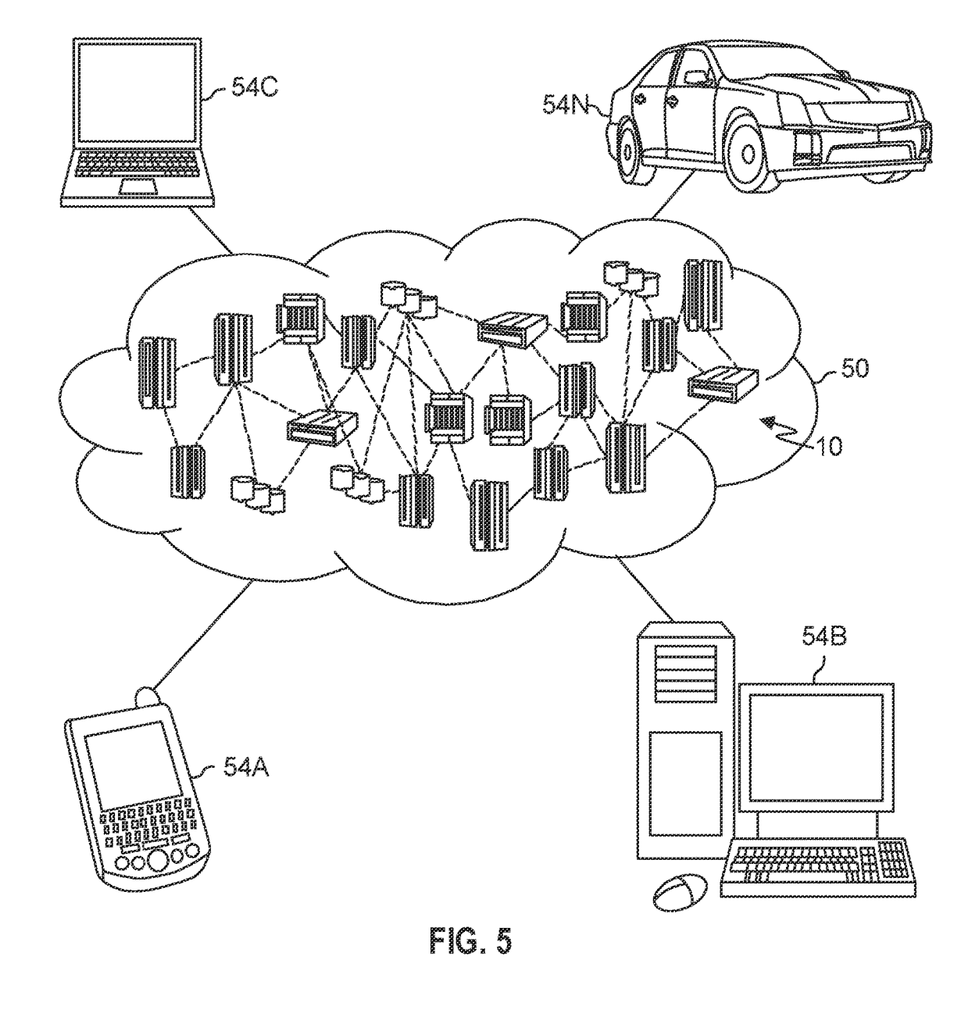
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment can communicate with any type of computerized device over any type of network and/or network addressable connection (e.g., using a web browser).

Figure 6:
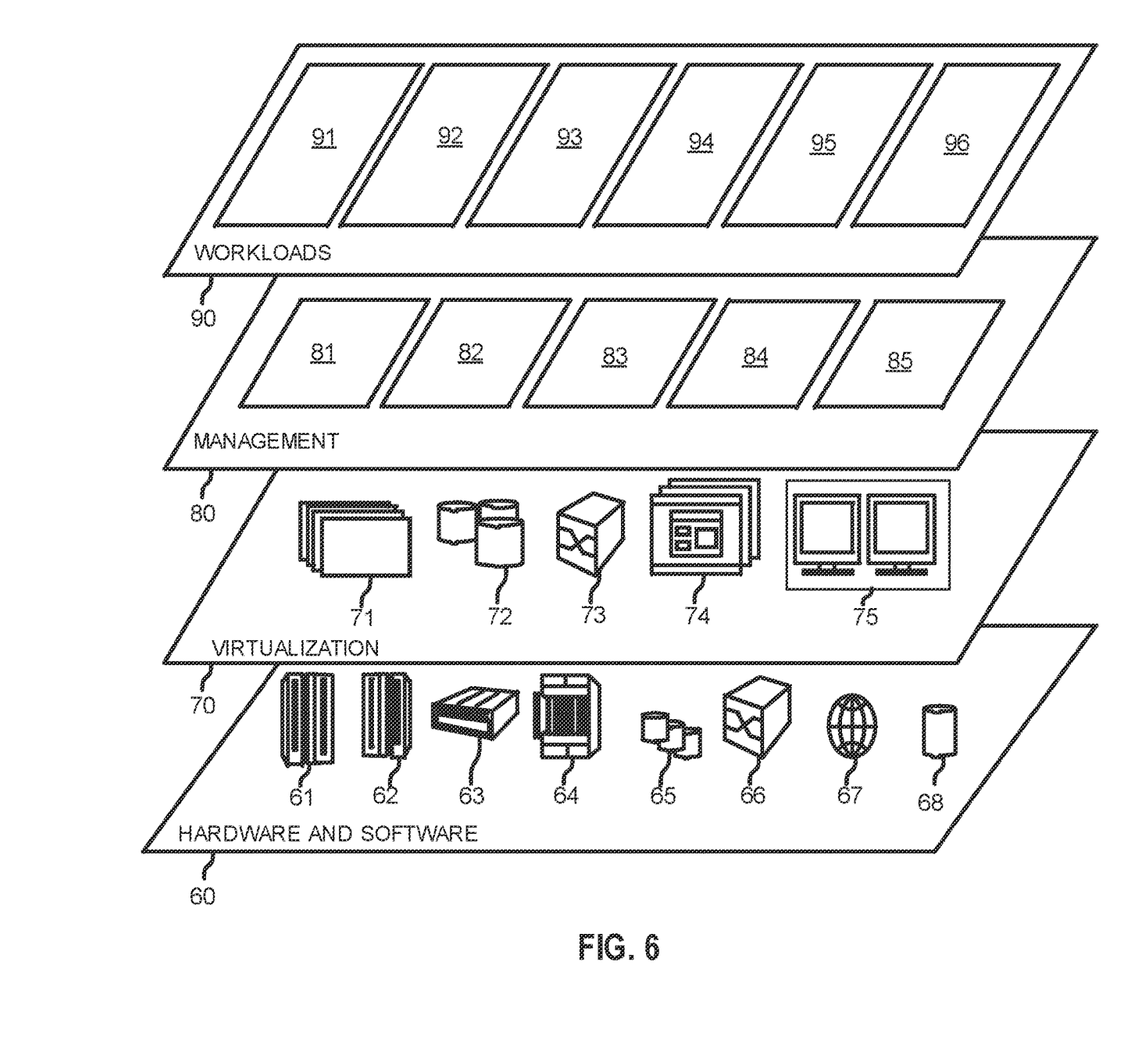
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech modeling processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving audio data for a user, the audio data containing human speech;
generating, using a first speech to text model, text data representing the human speech of the audio data;
identifying a set of transcription errors of the first speech to text model;
generating a set of artificial intelligence (AI) factsheets describing model metadata for the first speech to text model, wherein at least one of the set of AI factsheets is a confidence sheet including a local explanation of the first speech to text model that provides values of audio quality, transcript quality, stylization and data redaction metrics, wherein the set of AI factsheets is a plurality of AI factsheets and generating the set of AI factsheets further comprises:
generating a first AI factsheet for the first speech to text model, the first AI factsheet being a model factsheet; and
generating a second AI factsheet for the first speech to text model, the second AI factsheet being a transcript factsheet; and
based on the first speech to text model, the set of transcription errors, the text data, the first AI factsheet, and the second AI factsheet, generating a second speech to text model customized to the user, wherein the first speech to text model identifies training data or subsets thereof for input to train the second speech to text model, and selecting the training data to address deficiencies represented by the set of transcription errors identified from the first speech to text model.

2. The method of claim 1, wherein the set of transcription errors are a set of automatic speech recognition (ASR) errors and wherein identifying the set of ASR errors further comprises:
determining a set of characteristics for the set of ASR errors; and
attributing the set of ASR errors to a set of speech features of the audio data based on the set of characteristics.

3. The method of claim 2, wherein identifying the set of ASR errors further comprises:
clustering ASR errors of the set of ASR errors to generate ASR error clusters, each ASR error cluster associated with at least one speech feature of the audio data.

4. The method of claim 1, further comprising:
determining a customization level for the second speech to text model based on the set of AI factsheets.

5. A system, comprising:
one or more processors; and
a computer-readable storage medium, coupled to the one or more processors, storing program instructions that, when executed by the one or more processors, cause the one or more processors to perform operations comprising:
receiving audio data for a user, the audio data containing human speech;
generating, using a first speech to text model, text data representing the human speech of the audio data;
identifying a set of transcription errors of the first speech to text model;
generating a set of artificial intelligence (AI) factsheets describing model metadata for the first speech to text model, wherein at least one of the set of AI factsheets is a confidence sheet including a local explanation of the first speech to text model that provides values of audio quality, transcript quality, stylization and data redaction metrics, wherein the set of AI factsheets is a plurality of AI factsheets and generating the set of AI factsheets further comprises:

generating a first AI factsheet for the first speech to text model, the first AI factsheet being a model factsheet; and     generating a second AI factsheet for the first speech to text model, the second AI factsheet being a transcript factsheet; and based on the first speech to text model, the set of transcription errors, the text data, the first AI factsheet, and the second AI factsheet, generating a second speech to text model customized to the user, wherein the first speech to text model identifies training data or subsets thereof for input to train the second speech to text model, and selecting the training data to address deficiencies represented by the set of transcription errors identified from the first speech to text model.

6. The system of claim 5, wherein the set of transcription errors are a set of automatic speech recognition (ASR) errors and wherein identifying the set of ASR errors further comprises:

determining a set of characteristics for the set of ASR errors; and     attributing the set of ASR errors to a set of speech features of the audio data based on the set of characteristics.

7. The system of claim 6, wherein identifying the set of ASR errors further comprises:

clustering ASR errors of the set of ASR errors to generate ASR error clusters, each ASR error cluster associated with at least one speech feature of the audio data.

8. The system of claim 5, wherein the operations further comprise:

determining a customization level for the second speech to text model based on the set of AI factsheets.

9. A computer program product comprising a computer readable storage medium having program instructions embodied therewith, the program instructions being executable by one or more processors to cause the one or more processors to perform operations comprising:

receiving audio data for a user, the audio data containing human speech;

generating, using a first speech to text model, text data representing the human speech of the audio data;

identifying a set of transcription errors of the first speech to text model;

generating a set of artificial intelligence (AI) factsheets describing model metadata for the first speech to text model, wherein at least one of the set of AI factsheets is a confidence sheet including a local explanation of the first speech to text model that provides values of audio quality, transcript quality, stylization and data redaction metrics, wherein the set of AI factsheets is a plurality of AI factsheets and generating the set of AI factsheets further comprises:

generating a first AI factsheet for the first speech to text model, the first AI factsheet being a model factsheet; and         generating a second AI factsheet for the first speech to text model, the second AI factsheet being a transcript factsheet; and     based on the first speech to text model, the set of transcription errors, the text data, the first AI factsheet, and the second AI factsheet, generating a second speech to text model customized to the user, wherein the first speech to text model identifies training data or subsets thereof for input to train the second speech to text model, and selecting the training data to address deficiencies represented by the set of transcription errors identified from the first speech to text model.

10. The computer program product of claim 9, wherein the set of transcription errors are a set of automatic speech recognition (ASR) errors and wherein identifying the set of ASR errors further comprises:

determining a set of characteristics for the set of ASR errors; and     attributing the set of ASR errors to a set of speech features of the audio data based on the set of characteristics.

11. The computer program product of claim 10, wherein identifying the set of ASR errors further comprises:

clustering ASR errors of the set of ASR errors to generate ASR error clusters, each ASR error cluster associated with at least one speech feature of the audio data.

12. The computer program product of claim 9, wherein the operations further comprise:

determining a customization level for the second speech to text model based on the set of AI factsheets.

\* \* \* \* \*